(12) United States Patent
Lu

(10) Patent No.: US 9,794,008 B2
(45) Date of Patent: Oct. 17, 2017

(54) NOISE POWER ESTIMATOR, RECEIVER AND METHOD FOR NOISE POWER ESTIMATION

(71) Applicant: Montage Technology (Shanghai) Co., Ltd., Shanghai (CN)

(72) Inventor: Zhen Lu, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/977,656

(22) Filed: Dec. 22, 2015

(65) Prior Publication Data
US 2017/0163355 A1   Jun. 8, 2017

(30) Foreign Application Priority Data

Dec. 4, 2015   (CN) .......................... 2015 1 0887422
Dec. 11, 2015  (CN) .......................... 2015 1 0924645

(51) Int. Cl.
| H04B 3/46 | (2015.01) |
| H04B 17/20 | (2015.01) |
| H04B 1/10 | (2006.01) |
| H04L 25/03 | (2006.01) |
| H04L 27/26 | (2006.01) |

(52) U.S. Cl.
CPC .............. H04B 17/20 (2015.01); H04B 1/10 (2013.01); H04L 25/03019 (2013.01); H04L 27/265 (2013.01); H04L 27/2628 (2013.01)

(58) Field of Classification Search
CPC ....................................................... H04B 1/00
USPC .......................................................... 375/227
See application file for complete search history.

(56) References Cited

U.S. PATENT DOCUMENTS

| 6,192,238 | B1 * | 2/2001 | Piirainen | .............. | H04B 7/0857 455/422.1 |
| 2002/0146063 | A1 * | 10/2002 | Gorokhov | ......... | H04L 25/03159 375/148 |
| 2004/0185787 | A1 * | 9/2004 | Molisch | ............. | H04B 1/71637 455/67.11 |
| 2006/0133260 | A1 * | 6/2006 | Kim | ..................... | H04B 17/336 370/208 |

(Continued)

OTHER PUBLICATIONS

Bowei Song, Lin Gui, Yunfeng Guan and Wenjun Zhang, On Channel Estimation and Equalization in TDS-OFDM Based Terrestrial HDTV Broadcasting System, Consumer Electronics, IEEE Transactions vol. 51 Issue: 3, Aug. 2005.

(Continued)

*Primary Examiner* — Lihong Yu
(74) *Attorney, Agent, or Firm* — Oliff PLC

(57) ABSTRACT

A noise power estimator, comprising: a first subtractor configured to generate at least one first signal by subtracting a reconstructed interference signal from a symbol of a received first time-domain training sequence; a second subtractor configured to generate at least one second signal by subtracting an estimated value for the first time-domain training sequence from one of the at least one first signal; an averaging circuit configured to generate at least one square average value by average the at least part of the at least one second signals; and a detector configured to detect a minimum value among the at least one square average value and output the minimum value as a noise power estimation value.

18 Claims, 10 Drawing Sheets

(56) References Cited

U.S. PATENT DOCUMENTS

| | | | |
|---|---|---|---|
| 2007/0064824 A1* | 3/2007 | Wang | H04L 25/03006 375/260 |
| 2010/0303128 A1* | 12/2010 | Isley | H04L 12/5601 375/132 |
| 2011/0044409 A1* | 2/2011 | Yoshimoto | H04J 11/004 375/340 |
| 2014/0153625 A1* | 6/2014 | Vojcic | H04L 1/005 375/224 |

OTHER PUBLICATIONS

Weigiang Liang, Wenjun Zhang, Dazhi He, Yunfeng Guan, Yao Wang, Jun Sun, Digital Terrestrial Television Broadcasting in China, IEEE MultiMedia, vol. 14, No. 3, pape 92-97, Jul.-Sep. 2007.

Zhixin Yang, Jun Wang, Meng Han, Changyong Pan, Lin Yang and Zhouan Han, Channel Estimation of DMB-T, Conference Communications, Circuits and Systems and West Sino Expositions, IEEE 2002 International Conference on, vol. 2 p. 1069-1072, 2002.

Framing Structure, Channel Coding and Modulation for Digital Television Terrestrial Broadcasting System GB 20600-2006, p. 10-15, Aug. 18, 2006.

* cited by examiner reconstructed interference signal

NOISE POWER ESTIMATOR, RECEIVER AND METHOD FOR NOISE POWER ESTIMATION

CROSS REFERENCE TO RELATED APPLICATION

This application claims priority to Chinese application No. 201510887422.X entitled "Channel Estimator, Demodulator and Method for channel estimation," filed on Dec. 4, 2015 by Montage Technology (Shanghai) Co., Ltd., and Chinese application No. 201510924645.9 entitled "Noise Power Estimator, Receiver and Method for noise power estimation," filed on Dec. 11, 2015 by Montage Technology (Shanghai) Co., Ltd., which are incorporated herein by reference.

TECHNICAL FIELD

The present invention relates to noise power estimator, and more particularly, but not limited to a noise power estimator, receiver and method for noise power estimation.

BACKGROUND

Receivers use forward error correction code (FEC) to correct propagation errors in signal transmission. Most error-correcting codes are required to calculate the reliability of each received bit, which requires accurate noise power information.

Digital Terrestrial Multimedia Broadcast (DTMB) systems use Orthogonal Frequency Division Multiplexing (OFDM) multi-carrier modulation. OFDM systems usually use pilots defined by system to estimate the noise power. However, as there is no pilot in DTMB systems, it is difficult for the system to get accurate noise power. Therefore, it is desirable to obtain accurate noise power in DTMB systems.

SUMMARY

An embodiment of the invention discloses a noise power estimator, comprising: a first subtractor configured to generate at least one first signal by subtracting a reconstructed interference signal from a symbol of a received first time-domain training sequence; a second subtractor coupled to the first subtractor and configured to generate at least one second signal by subtracting an estimated value for the first time-domain training sequence from one of the at least one first signal; an averaging circuit coupled to the second subtractor and configured to generate at least one square average value by averaging at least part of the at least one second signals; and a detector coupled to the averaging circuit and configured to detect a minimum value among the at least one square average value and output the minimum value as a noise power estimation value.

Another embodiment of the invention discloses a receiver comprising: the above noise power estimator, a Channel State Information (CSI) circuit coupled to the noise power estimator and configured to obtain channel state information based on the noise power estimation value; and a forward error corrector coupled to the CSI circuit and configured to correct error based on the channel state information.

Another embodiment of the invention discloses a method of estimating noise power, comprising: generating at least one first signal by subtracting reconstructed interference signal from a symbol of received first time-domain training sequence; generating at least one second signal by subtracting an estimated value for the first time-domain training sequence from one of the at least one first signal; generating at least one square average value by averaging at least part of the at least one second signals; detecting a minimum value among the at least one square average value; and outputting the minimum value as a noise power estimation value.

DESCRIPTION OF THE DRAWINGS

The present invention is illustrated in an exemplary manner by the accompanying drawings. The drawings should be understood as exemplary rather than limiting, as the scope of the invention is defined by the claims. In the drawings, the identical reference signs represent the same elements.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

Figure 1:
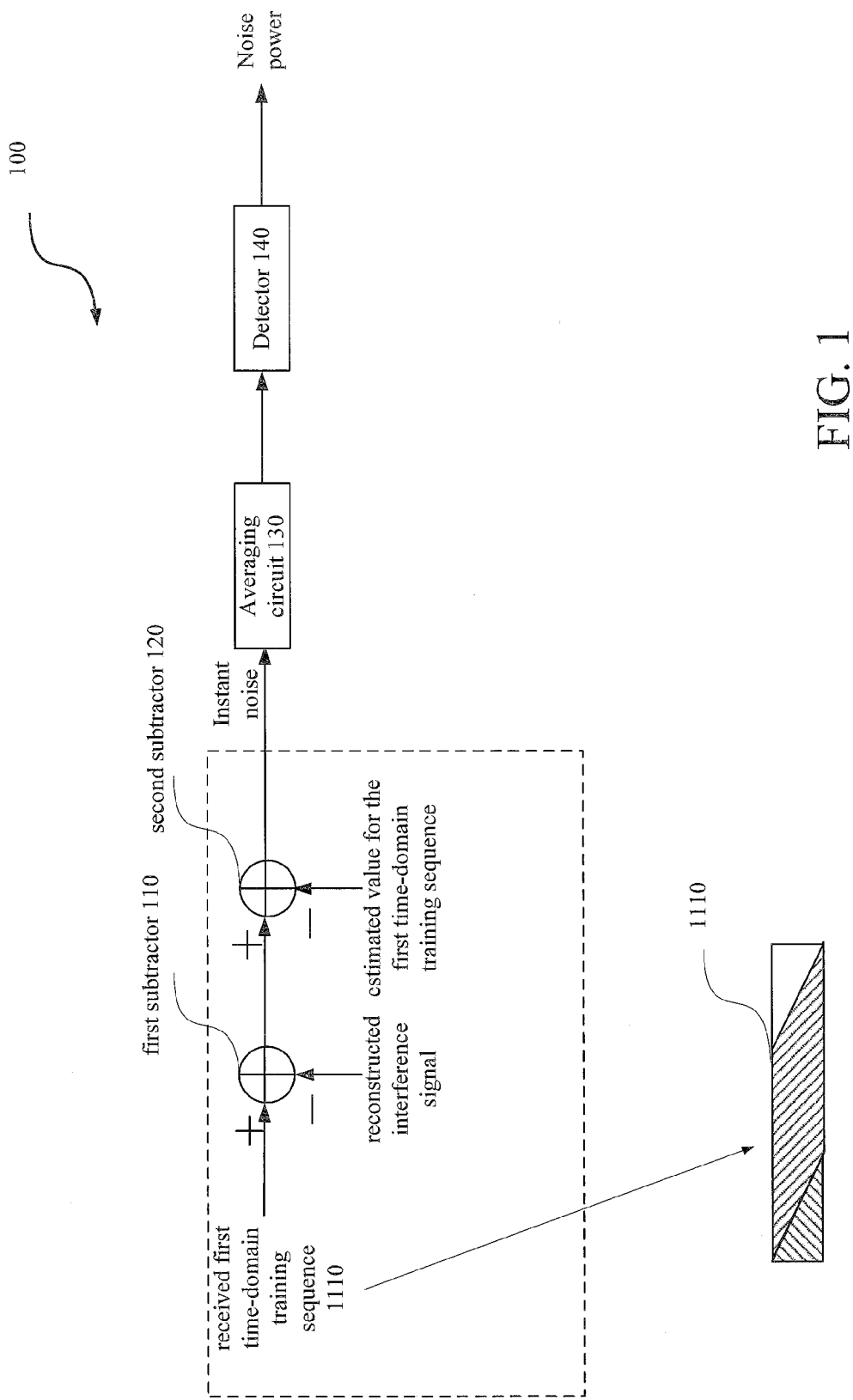
FIG. 1 is a diagram illustrating a noise power estimator according to an embodiment of the invention.

FIG. 1 is a diagram illustrating a noise power estimator 100 according to an embodiment of the invention. The noise power estimator 100 comprises a first subtractor 110, a second subtractor 120, an averaging circuit 130, and a detector 140. The first subtractor 110 receives a symbol of a first time-domain training sequence. The first time-domain training sequence may be the sequence 1110 also shown in FIG. 1. The sequence 1100 is a time-domain sequence which includes three parts: the data interference, training sequence which has experienced the channel, and noise. The three parts included in the sequence 1110 are respectively shown as a backslash part (in a triangle shape) that represents interference signal from last frame, a slash part (in a parallelogram shape) that represents training sequence which has experienced the channel and a blank part (in a triangle shape) that represents interference signal from current frame. Note the noise is not shown in sequence 1110. The sequence 1110 will be discussed in further with respect to FIG. 2.

As shown in FIG. 1, the first subtractor 110 generates at least one first signal by subtracting a reconstructed interference signal from a symbol of a received first time-domain training sequence. Note different symbols in a same time-domain training sequence use different reconstructed interference signal for calculating instantaneous noise signal in order to calculate noise power. The second subtractor 120 is coupled to the first subtractor 110 and generates at least one second signal by subtracting an estimated value for the first time-domain training sequence from one of the at least one first signal. The averaging circuit 130 is coupled to the second subtractor 120 and generates at least one square average value by averaging at least part of the at least one second signals. The detector 140 is coupled to the averaging circuit 130 and detects a minimum value among the at least one square average value, and outputs the minimum value as a noise power estimation value to the Channel State Information (CSI) circuit 730 discussed below with reference to FIG. 7. Note the minimum value is a digital value.

Figure 2:
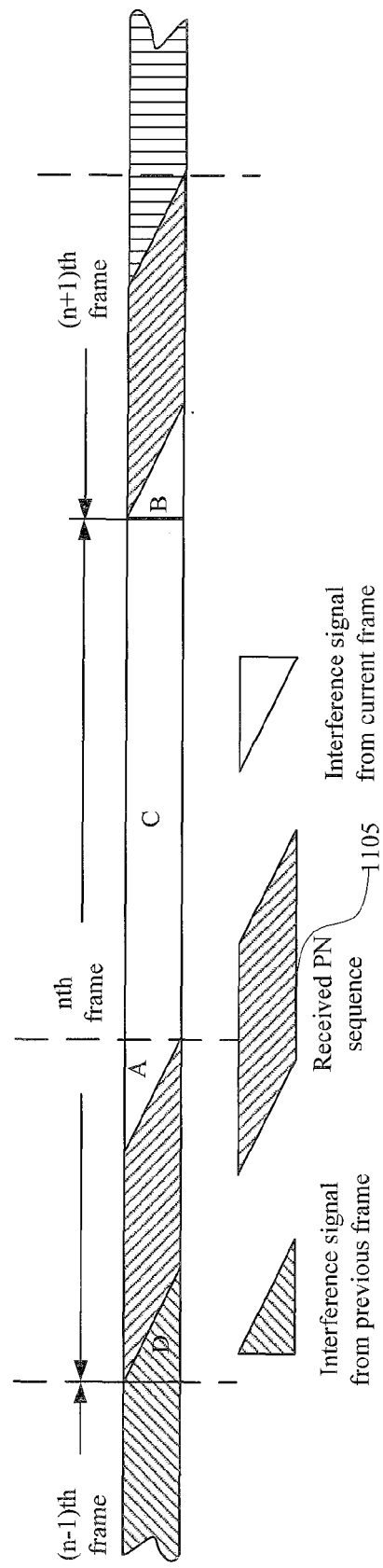
FIG. 2 a diagram illustrating a received signal of a noise power estimator according to an embodiment of the invention.

FIG. 2 is a diagram illustrating a received signal of a noise power estimator according to an embodiment of the invention. FIG. 2 shows a PN sequence for DTMB system, as an example of the first time-domain training sequence. In FIG. 2, a (n−1)th frame, a nth frame, and a (n+1)th frame are shown. Due to the multi-path effect, actually received n-th PN signal (shown as a rectangle, and represented in arrows) that includes PN sequence of a n-th frame may include interference signal from previous frame, shown as the backslash triangle and marked as D, and interference signal from current frame, shown as the blank triangle and marked as A, and the received PN sequence, shown as the parallelogram shape. Note FIG. 2 does not reflect noise though.

Figure 3A:
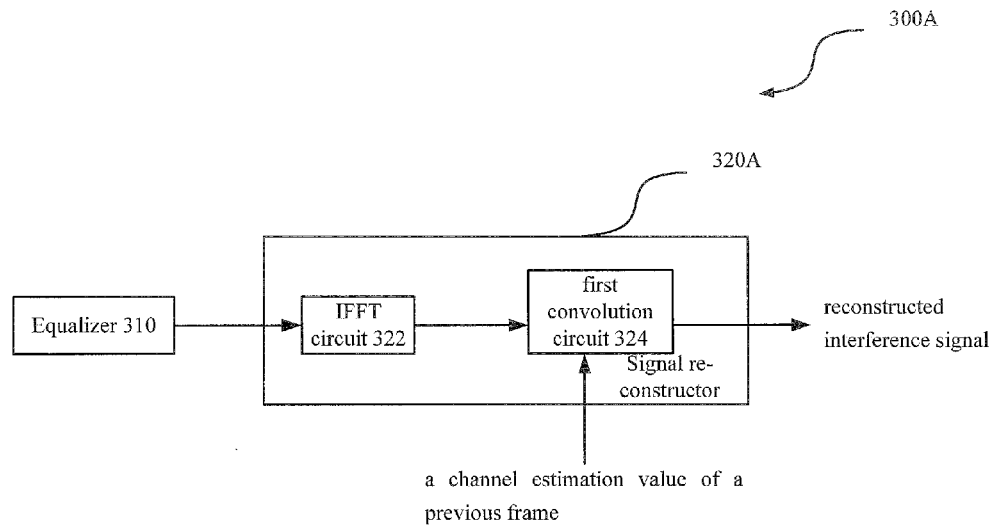
FIG. 3A is a diagram illustrating circuit 300A to generate reconstructed interference signal shown in FIG. 1 according to an embodiment of the invention.

FIG. 3A is a diagram illustrating circuit 300A to generate reconstructed interference signal shown in FIG. 1 according to an embodiment of the invention. The circuit 300A comprises an equalizer 310 and a signal re-constructor 320A. The equalizer 310 generates a pre-equalized signal by pre-equalizing a received signal. The signal re-constructor 320A is coupled to the equalizer 310 and generates a reconstructed interference signal based on the pre-equalized signal.

In FIG. 3A, the signal re-constructor 320A further comprises an IFFT circuit 322 and a first convolution circuit 324. The IFFT circuit 322 is configured to generate an IFFT result by performing IFFT calculation on the pre-equalized signal received from the equalizer 310. The first convolution circuit 324 is configured to generate the reconstructed interference signal by convoluting the IFFT result with the channel estimation value of the previous frame. The channel estimation value of the previous frame, that is, a channel estimation value for the previous frames, is a final updated result for a plurality of instantaneous channel estimation value for a plurality of symbols in the previous frame.

The circuit 300A shown in FIG. 3A performs a time domain operation for generating reconstructed interference signal from the pre-equalized signal by first performing IFFT operation then perform convolution operation. Alternatively, the operation may be performed equivalently on the frequency domain instead of time domain.

Figure 3B:
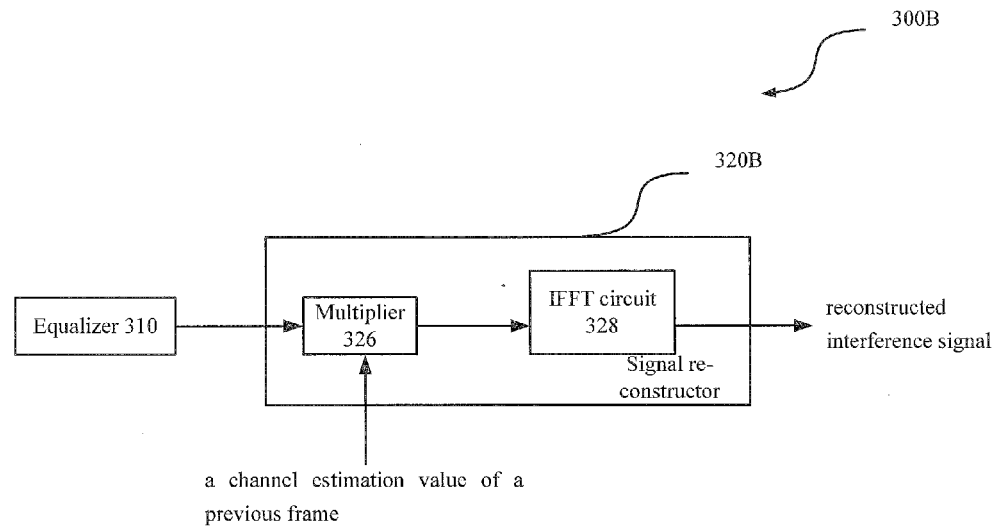
FIG. 3B is a diagram illustrating another circuit 300B to generate reconstructed interference signal shown in FIG. 1 according to an embodiment of the invention.

Accordingly, FIG. 3B is a diagram illustrating another circuit 300B to generate reconstructed interference signal shown in FIG. 1 according to an embodiment of the invention. The signal re-constructor 320B further comprises a multiplier 326 and an IFFT circuit 328. The multiplier 326 is configured to generate a multiplied signal by multiplying the pre-equalized signal with a channel estimation value of a previous frame. The IFFT circuit 328 is configured to generate the reconstructed interference signal by performing IFFT calculation on the multiplied signal.

Figure 3C:
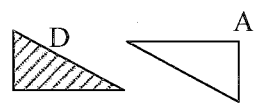
FIG. 3C is a diagram illustrating the reconstructed interference signal according to an embodiment of the invention.

FIG. 3C is a diagram illustrating the reconstructed interference signal according to an embodiment of the invention. As shown in FIG. 3C, the reconstructed interference signal includes two parts: the front part includes Part D of the n−1th frame (interference signal from previous frame, i.e., (n−1)th frame) and the rear part includes Part A of the n-th frame (Interference signal from current frame, i.e., nth frame).

Figure 4A:
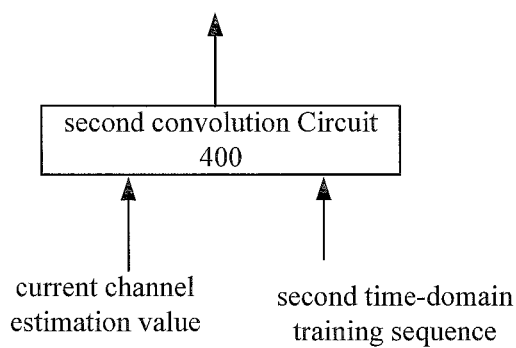
FIG. 4A is a diagram illustrating a second convolution circuit to generate estimated value for the first time-domain training sequence shown in FIG. 1 according to an embodiment of the invention.

FIG. 4A is a diagram illustrating a second convolution circuit 400 to generate estimated value for the first time-domain training sequence shown in FIG. 1 according to an embodiment of the invention. The second convolution circuit 400 generates an estimated value for the first time-domain training sequence by convoluting a second time-domain training sequence with a current instantaneous channel estimation value. The second time-domain training sequence represents a time-domain training sequence generated by the receiver or noise power estimator. The second time-domain training sequence is a locally generated time-domain sequence. The second time-domain training sequence may be previously generated and stored in the receiver. Alternatively, the second time-domain training sequence may be generated in real-time by a shifting register, which requires fewer hardware resources, such as memories.

Figure 7:
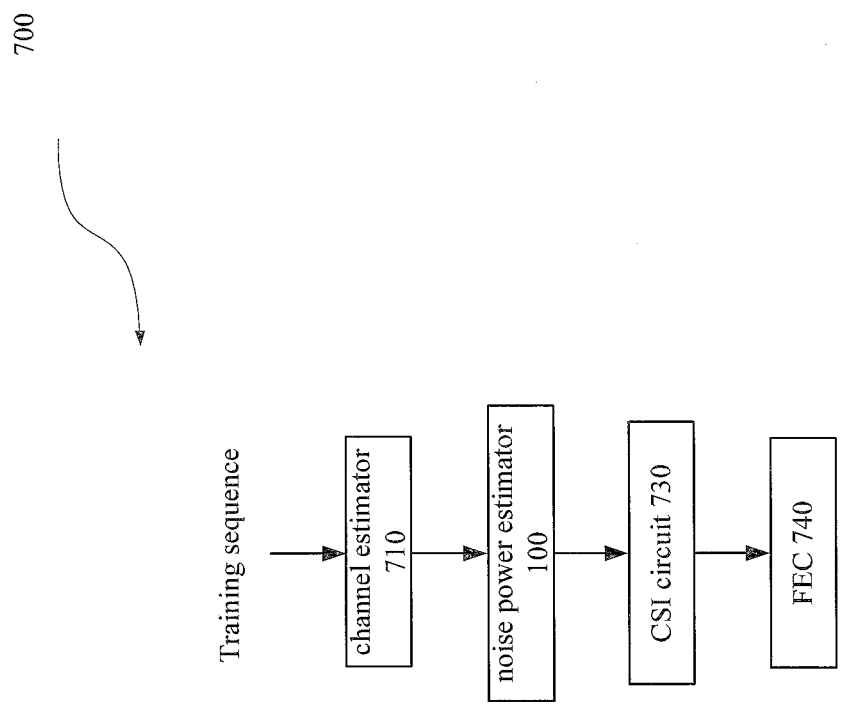
FIG. 7 is a diagram illustrating a receiver comprising a noise power estimator shown in FIG. 1 according to an embodiment of the invention.

Referring to FIG. 7, a channel estimator 710 performs the channel estimation. For example, the channel estimator 710 may reuse the circuit and structure of the noise power estimator in iterations in a symbol-by-symbol manner. Alternatively, if the channel estimator uses other channel estimation methods, such as Least-square estimation, or Minimum Mean Square Error (MMSE), then the channel estimator may not reuse the noise power estimator, or may not use iteration. In other words, reuse of noise power estimator by the channel estimator is optional.

Figure 4B:
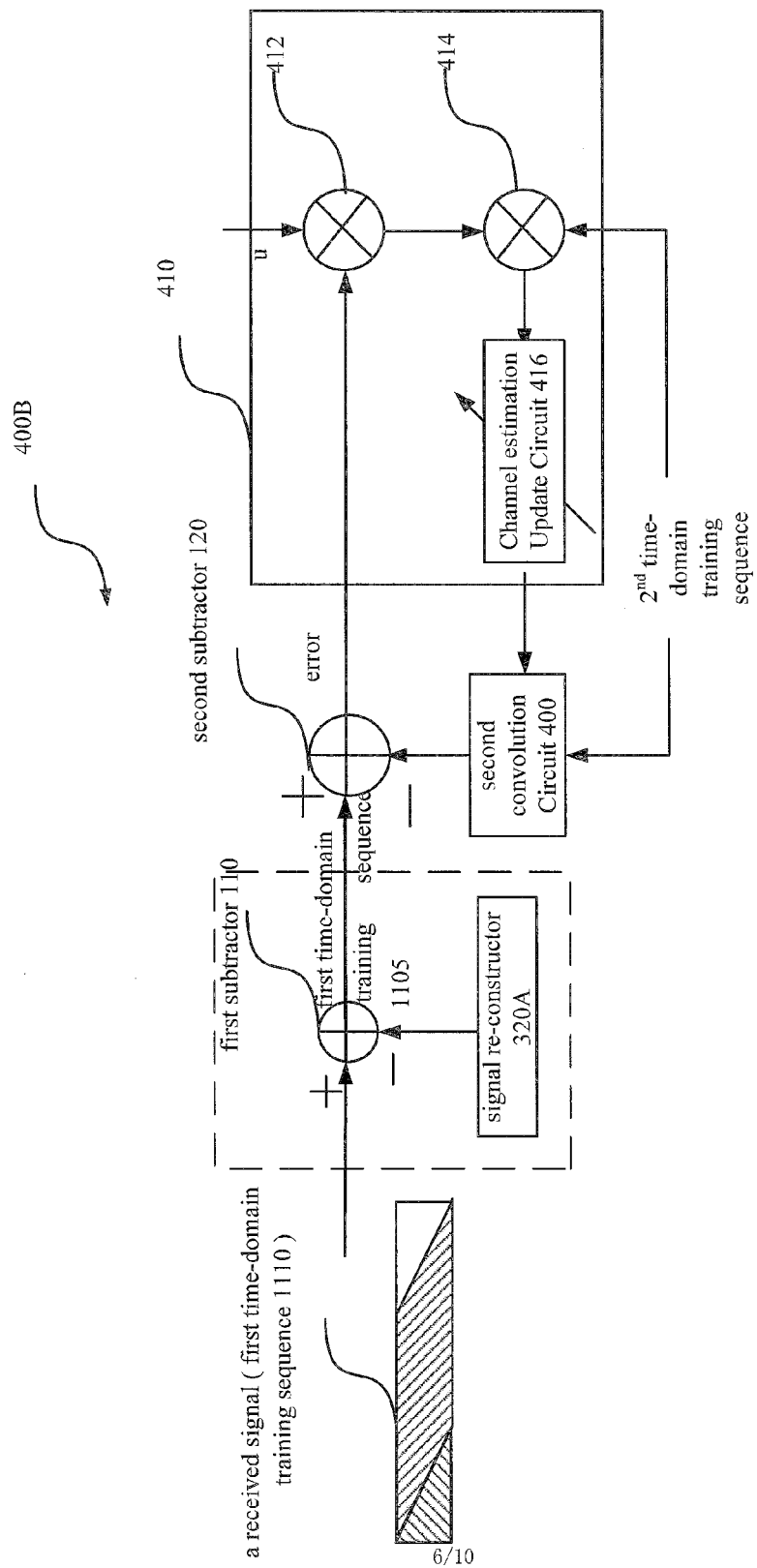
FIG. 4B is a diagram illustrating a channel estimator 400B according to an embodiment of the invention.

FIG. 4B is a diagram illustrating a channel estimator 400B according to an embodiment of the invention. The channel estimator 400B may comprise a second convolution circuit 400 discussed above with respect to FIG. 4A. The channel estimator 400B may further comprise a signal re-constructor 320A discussed above with respect to FIG. 3A. Note both the first time domain training sequence and the second time domain training sequence have a plurality of symbols. For example, the first time-domain training sequence 1110 includes 140 symbols. Each time a receiver of the channel estimator 400B receives one symbol of the 140 symbols of the first time-domain training sequence 1110, a first subtractor 110, the second convolution circuit 400 and an updating circuit 410 of the channel estimator 400B perform their respective operation. During each iteration, the instantaneous error generated by the second subtractor 120 is updated, while the second time-domain training sequence maintains unchanged. Therefore the instantaneous channel estimation value is updated by channel estimation update circuit 416 accordingly. An estimated value for the first training sequence is obtained by the second convolution circuit 400 by, for example, performing convoluting operation on the updated instantaneous channel estimation value and the second time-domain training sequence. The estimated value in turn is fed back to the second subtractor 120. The subtractor 120 subtracts the estimated value for the first training sequence from the first time-domain training sequence 1105, so as to obtain an updated instantaneous error. The channel estimation is completed when all 140 symbols in the first time-domain training sequence have been treated accordingly. Note the second time-domain training sequence remains unchanged during 140 iterations for channel estimation based on the 140 symbols of the first time-domain training sequence.

Referring back to FIG. 2, for example, the first subtractor 110 generates the first time-domain training sequence by subtracting Part D of the n−1th frame (interference signal from previous frame) and Part A of the n-th frame (Interference signal from current frame) from the received signal (including parts D, received PN sequence, and part A). As a result, the received PN sequence with interference cancelled (denoted as 1105) is generated. Note the sequence 1105 is only influenced by noise, while interference is cancelled from sequence 1105.

Figure 5:
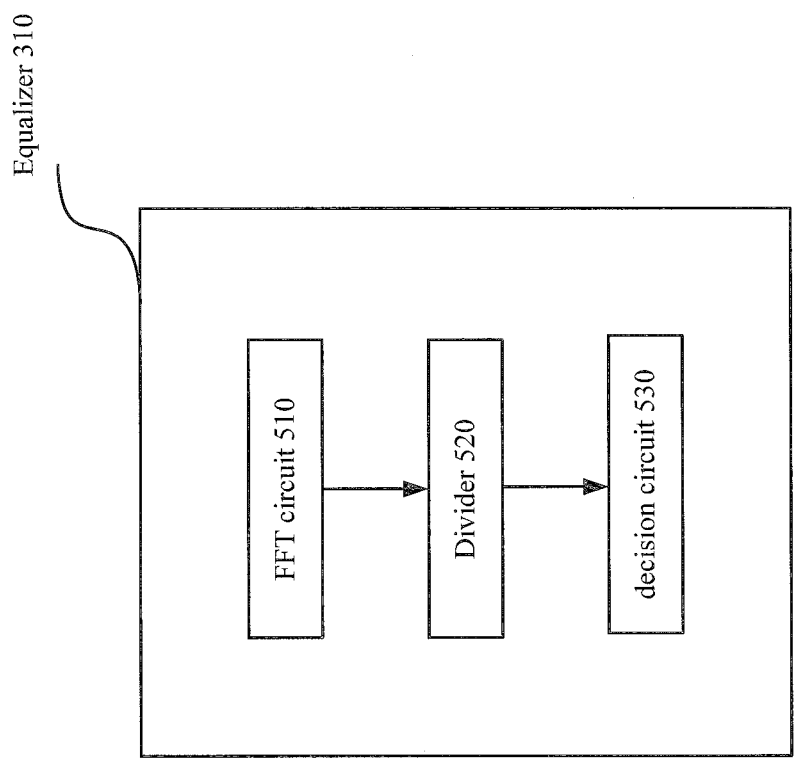
FIG. 5 is a block diagram illustrating the structure of the equalizer according to an embodiment of the invention.

FIG. 5 is a block diagram illustrating the structure of the equalizer 310 shown in FIG. 3A and FIG. 3B. As shown in FIG. 5, the equalizer 310 further comprises a FFT circuit 510, a divider 520, and a decision circuit 530. The FFT circuit 510 is configured to generate a FFT result by performing FFT calculation on the received signal. The divider 520 is coupled to the FFT circuit 510 and is configured to generate a quotient by dividing the FFT result by a channel estimation value of a previous frame. The channel estimation value of the previous frame, that is, a channel estimation value for the previous frames, is a final updated result for a plurality of instantaneous channel estimation value for a plurality of symbols in the previous frame. The decision circuit 530, coupled to the divider 520 and is configured to retrieve a transmitting signal based on the quotient.

Figure 6:
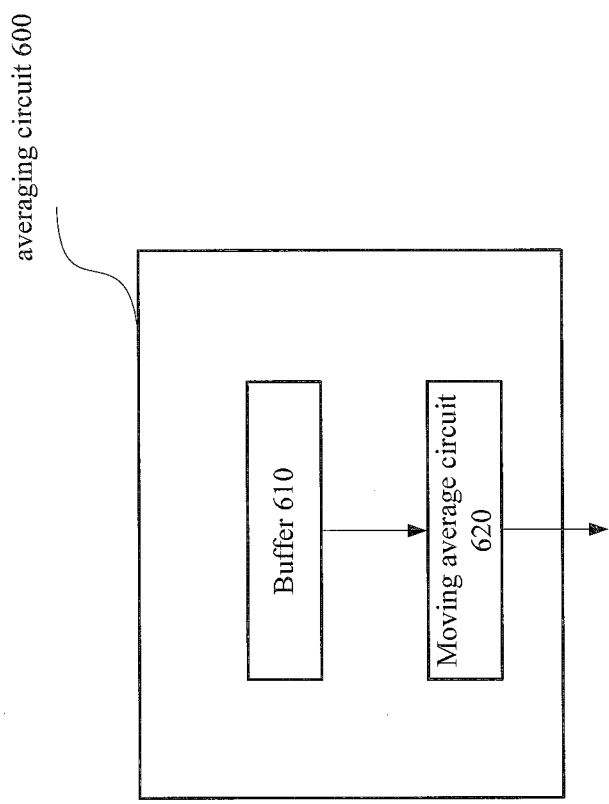
FIG. 6 is an averaging circuit according to an embodiment of the invention.

FIG. 6 is a diagram illustrating an averaging circuit 600 according to an embodiment of the invention. The averaging circuit 600 comprises a buffer 610 and a moving average circuit 620. The buffer 610 buffers the at least one second signal, for example, the buffer 610 buffers several instantaneous noise values. The moving averaging circuit 620 generates at least one square average value by averaging at least part of the at least one second signals that are in the buffer. For example, the first time domain sequence, such as the PN sequence comprises 420 symbols. For example, suppose the first time domain sequence includes M symbols, and a moving window length is N symbols, where N<M. The moving average circuit 620 first calculates the square average of 1 to N symbols in the moving window, then removes the first symbol and add a next symbol, that is, 2 to N+1, then 3 to N+2, . . . until M−N+1 to M, which follows First In First Out (FIFO) order.

For example, a moving window length of the moving average circuit 620 is less than the length of a locally generated time-domain training sequence, for example the moving window length is 100 symbols. As the moving window moves, the average circuit 600 calculates the square average of the 1-100 symbols in the moving window, then the square average of 2 to 101 symbols, then the square average of 3 to 102, . . . , in turns, until a last symbol of the first time-domain sequence has been calculated. More specifically, if the number of symbols within the window is less than the window length, then the moving average is completed. In another embodiment, when the moving average is initially performed, the number of symbols within the window of the moving average circuit 620 is smaller than the length of the window, then there is no output from the moving average circuit 620. The moving average circuit 620 starts to output data until the number of symbols within the window equals the length of the window.

Referring back to FIG. 1, the detector 140 detects a minimum value among the at least one square average value, and outputs the minimum value as a noise power estimation value. As the estimation of noise power is influenced by the reconstructed interference, the detector 140 is used to reduce the influence of error of reconstructed interference to noise power.

FIG. 7 is a diagram illustrating a receiver 700 comprising the noise power estimator 100 shown in FIG. 1 according to an embodiment of the invention. The receiver 700 may be a receiver for Orthogonal Frequency Division Multiplexing (OFDM) system with time-domain training sequence. The receiver 700 comprises a channel estimator 710, a noise power estimator 100, a channel state information circuit 730 and a forward error corrector (FEC) 740. The channel estimator 710 can generate errors, i.e., noise sample generated by subtracting transmitted signal from received time-domain training sequence. The noise power estimator 100 is coupled to the channel estimator 710 and generates noise power estimation value from the error. The Channel State Information (CSI) circuit 730 is coupled to the noise power estimator 100 and configured to obtain channel state information based on the noise power estimation value. The forward error corrector 740 is coupled to the CSI circuit 730 and configured to correct error based on the channel state information. Note the channel estimator 710 shown in FIG. 7 is optional. In other words, the noise power estimator may be used independent of the channel estimator 400B discussed with respect to FIG. 4B.

Figure 8:
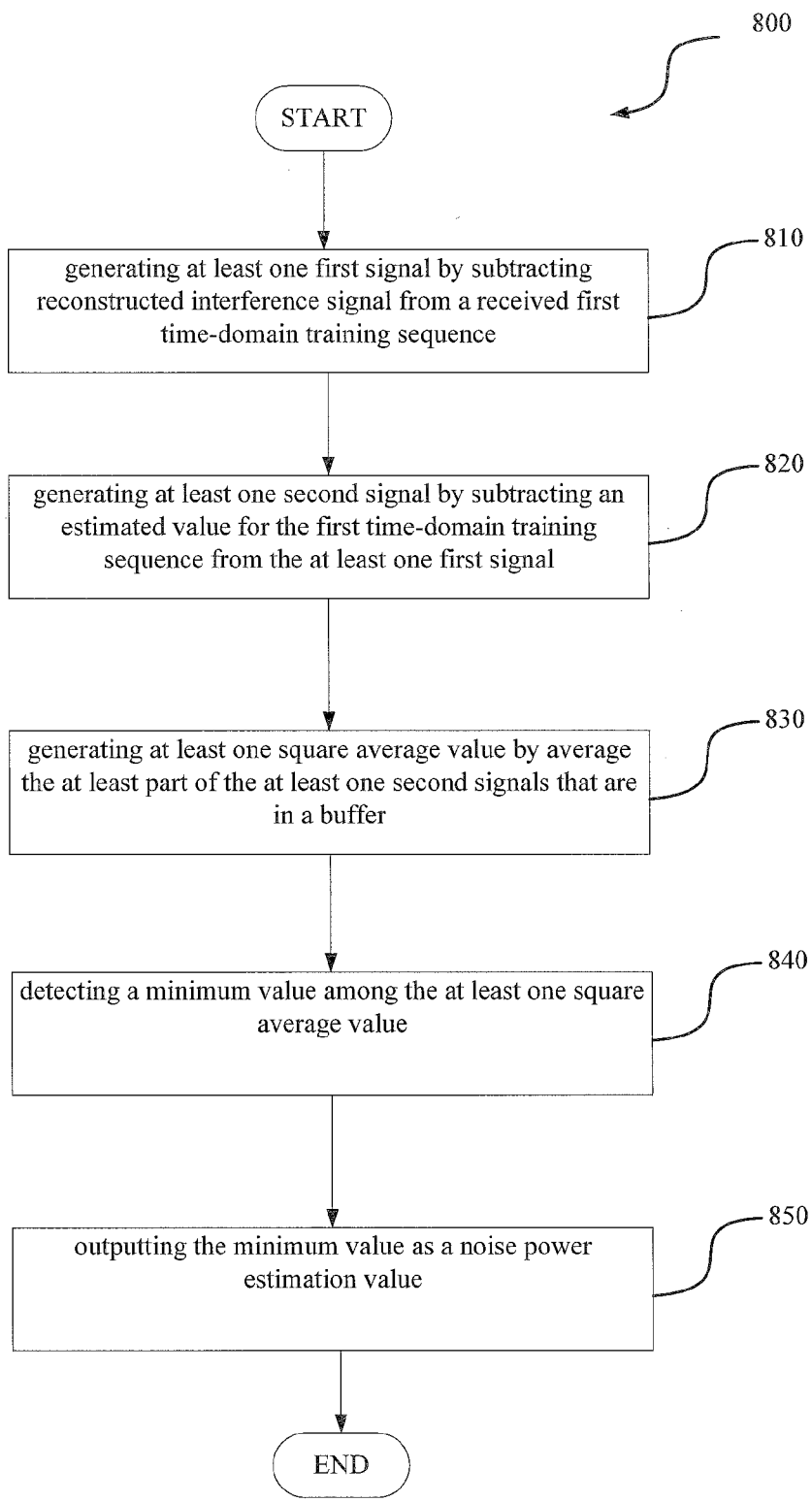
FIG. 8 is a flow chart illustrating a method of performing channel estimation according to another embodiment of the invention.

FIG. 8 is a flow chart illustrating a method 800 of performing noise power estimation according to another embodiment of the invention.

The method 800 of estimating noise power, comprises: generating, in block 810, at least one first signal by subtracting reconstructed interference signal from a symbol of a received first time-domain training sequence; generating, in block 820, at least one second signal by subtracting an estimated value for the first time-domain training sequence from one of the at least one first signal; generating, in block 830, at least one square average value by averaging at least part of the at least one second signals; detecting, in block 840, a minimum value among the at least one square average value; and outputting, in block 850, the minimum value as a noise power estimation value.

Alternatively, the method 800 further comprises generating a pre-equalized signal by pre-equalizing the received signal; and generating the reconstructed interference signal based on the pre-equalized signal.

Alternatively, generating the pre-equalized signal further comprises: generating a FFT result by performing FFT calculation on the received signal; generating a quotient by dividing the FFT result by a channel estimation value of a previous frame; and retrieving a transmitting signal based on the quotient.

Alternatively, generating the reconstructed interference signal further comprises: generating an IFFT result by performing IFFT calculation on the pre-equalized signal; and generating the reconstructed interference signal by convoluting the IFFT result with a channel estimation value of a previous frame.

Alternatively, generating the reconstructed interference signal further comprises: generating a multiplied signal by multiplying the pre-equalized signal with a channel estimation value of a previous frame; and generating the reconstructed interference signal by performing IFFT calculation on the multiplied signal.

Alternatively, the method 800 further comprises generating the estimated value for the first time-domain training sequence by convoluting a second time-domain training sequence with a current instantaneous channel estimation value, wherein the second time-domain training sequence represents a locally generated time-domain training sequence.

Alternatively, averaging the at least part of the at least one second signals is implemented by using moving average method.

Alternatively, a moving window length used in the moving average method is less than the length of a locally generated time-domain training sequence.

Alternatively, the first time-domain training sequence comprises a Pseudo Noise Sequence.

Embodiments of the present invention may have the advantage of (1) Greatly reduced complexity for estimate due to the fact that noise power estimation uses the channel estimator error signal.

(2) Compared to the frequency domain estimation, the estimation in time domain according to the embodiments of the invention can significantly improve the accuracy of estimation. The conventional frequency domain estimation, such as OFDM (DTMB) without pilots, hard decision is used in noise power estimation, which has a larger error.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

I claim:

1. A noise power estimator, comprising:
a first subtractor configured to generate at least one first signal by subtracting a reconstructed interference signal from a symbol of a received first time-domain training sequence;
a second subtractor coupled to the first subtractor and configured to generate at least one second signal by subtracting an estimated value for the first time-domain training sequence from one of the at least one first signal;
an averaging circuit coupled to the second subtractor and configured to generate at least one square average value by averaging the at least one second signals;
a detector coupled to the averaging circuit and configured to
detect a minimum value among the at least one square average value and
output the minimum value as a noise power estimation value;
an equalizer configured to generate a pre-equalized signal by pre-equalizing the received signal; and a signal re-constructor coupled to both the equalizer and the first subtractor and configured to generate the reconstructed interference signal based on the pre-equalized signal.

2. The noise power estimator of claim 1, wherein the equalizer further comprises:
a FFT circuit, configured to generate a FFT result by performing FFT calculation on the received signal;
a divider coupled to the FFT circuit and configured to generate a quotient by dividing the FFT result by a channel estimation value of a previous frame; and
a decision circuit, coupled to the divider and configured to retrieve a transmitting signal based on the quotient.

3. The noise power estimator of claim 1, wherein the signal re-constructor further comprises:
an IFFT circuit configured to generate an IFFT result by performing IFFT calculation on the pre-equalized signal; and
a first convolution circuit, coupled to the IFFT circuit and configured to generate the reconstructed interference signal by convoluting the IFFT result with a channel estimation value of a previous frame.

4. The noise power estimator of claim 1, wherein the signal re-constructor further comprises:
a multiplier, configured to generate a multiplied signal by multiplying the pre-equalized signal with a channel estimation value of a previous frame; and
an IFFT circuit coupled to the multiplier and configured to generate the reconstructed interference signal by performing IFFT calculation on the multiplied signal.

5. The noise power estimator of claim 1, further comprising:
a second convolution circuit coupled to the second subtractor, configured to generate the estimated value for the first time-domain training sequence by convoluting a second time-domain training sequence with a current instantaneous channel estimation value, wherein the second time-domain training sequence represents a locally generated time-domain training sequence.

6. The noise power estimator of claim 1, wherein the averaging circuit further includes a buffer configured to buffer the at least one second signal, and the averaging circuit is further configured to generate at least one square average value by averaging at least part of the at least one second signals that are in the buffer.

7. The noise power estimator of claim 1, wherein the averaging circuit is further configured to average the at least part of the at least one second signals by using a moving average method.

8. The noise power estimator of claim 7, wherein a moving window length used in the moving average method is less than the length of a locally generated time-domain training sequence.

9. The noise power estimator of claim 1, wherein the first time-domain training sequence comprises a Pseudo Noise Sequence.

10. A receiver comprising:
the noise power estimator according to claim 1;
a Channel State Information (CSI) circuit coupled to the noise power estimator and configured to obtain channel state information based on the noise power estimation value; and
a forward error corrector coupled to the CSI circuit and configured to correct error based on the channel state information.

11. A method of estimating noise power, comprising:
generating at least one first signal by subtracting a reconstructed interference signal from a symbol of a received first time-domain training sequence;
generating at least one second signal by subtracting an estimated value for the first time-domain training sequence from one of the at least one first signal;
generating at least one square average value by averaging the at least one second signals;
detecting a minimum value among the at least one square average value;
outputting the minimum value as a noise power estimation value;
generating a pre-equalized signal by pre-equalizing the received signal; and
generating the reconstructed interference signal based on the pre-equalized signal.

12. The method of claim 11, wherein generating the pre-equalized signal further comprises:
generating a FFT result by performing FFT calculation on the received signal;
generating a quotient by dividing the FFT result by a channel estimation value of a previous frame; and
retrieving a transmitting signal based on the quotient.

13. The method of claim 11, wherein generating the reconstructed interference signal further comprises:
generating an IFFT result by performing IFFT calculation on the pre-equalized signal; and
generating the reconstructed interference signal by convoluting the IFFT result with a channel estimation value of a previous frame.

14. The method of claim 11, wherein generating the reconstructed interference signal further comprises:
generating a multiplied signal by multiplying the pre-equalized signal with a channel estimation value of a previous frame; and
generating the reconstructed interference signal by performing IFFT calculation on the multiplied signal.

15. The method of claim 11, further comprising:
generating the estimated value for the first time-domain training sequence by convoluting a second time-domain training sequence with a current instantaneous channel estimation value, wherein the second time-domain training sequence represents a locally generated time-domain training sequence.

16. The method of claim 11, wherein averaging the at least part of the at least one second signals is implemented by using moving average method.

17. The method of claim 16, wherein a moving window length used in the moving average method is less than the length of a locally generated time-domain training sequence.

18. The method of claim 11, wherein the first time-domain training sequence comprises a Pseudo Noise Sequence.

* * * * *